(12) United States Patent
Bach et al.

(10) Patent No.: US 9,422,992 B2
(45) Date of Patent: Aug. 23, 2016

(54) DISC BRAKE WITH A SPRING ATTACHMENT

(75) Inventors: Uwe Bach, Niedernhausen (DE); Hans Bungert, Geisenheim (DE); Jürgen Bauer, Wiesbaden (DE); Ahmed Sefo, Frankfurt (DE)

(73) Assignee: CONTINENTAL TEVES AG & CO., OHG, Frankfurt (DE)

( * ) Notice: Subject to any disclaimer, the term of this patent is extended or adjusted under 35 U.S.C. 154(b) by 1215 days.

(21) Appl. No.: 11/628,544

(22) PCT Filed: May 13, 2005

(86) PCT No.: PCT/EP2005/052197
§ 371 (c)(1),
(2), (4) Date: Dec. 4, 2006

(87) PCT Pub. No.: WO2005/119082
PCT Pub. Date: Dec. 15, 2005

(65) Prior Publication Data
US 2007/0246312 A1    Oct. 25, 2007

(30) Foreign Application Priority Data

Jun. 4, 2004   (DE) .................. 10 2004 027 401
Dec. 27, 2004  (DE) .................. 10 2004 062 731

(51) Int. Cl.
*F16D 65/097*   (2006.01)

(52) U.S. Cl.
CPC ....... *F16D 65/0972* (2013.01); *F16D 65/0975* (2013.01); *F16D 65/0977* (2013.01); *F16D 65/0979* (2013.01)

(58) Field of Classification Search
USPC .................. 188/72.3, 73.38, 73.36
See application file for complete search history.

(56) References Cited

U.S. PATENT DOCUMENTS 5,109,959 A * 5/1992 Kondo et al. .............. 188/73.31
5,249,647 A   10/1993 Kobayashi et al.
(Continued)

FOREIGN PATENT DOCUMENTS

DE  10233446   2/2004
DE  10238734   3/2004
(Continued)

OTHER PUBLICATIONS

Patent Abstracts of Japan, vol. 006, No. 004, Jan. 12, 1982, JP 56 127830 A, Toyota Motor Corp.
Patent Abstracts of Japan, vol. 2000, No. 11, Jan. 3, 2001, JP 200 220670 A, Tokico Ltd.
(Continued)

*Primary Examiner* — Robert A Siconolfi
*Assistant Examiner* — James Hsiao

(57) ABSTRACT

A disc brake includes brake pads (7), which are slidably received on either side of a brake disc within guide portions (6) of the disc brake, and including a spring arrangement (10) for spring cushioning the brake pads (7). Disc brakes of this type are frequently used in motor vehicles. To improve the spring cushioning of the brake pads, the spring arrangement (10) is equipped with at least one radial spring element (11) for radially clamping the brake pads (7) with respect to the guide portions (6), at least one axial spring element (22) for axially clamping the brake pads (7) in relation to each other, and at least one tangential spring element (18) for tangentially clamping the brake pads (7) in relation to the guide portions (6). The three spring elements (11, 18, 22) act in different spatial dimensions and can be embodied as separate components which are independent of each other.

21 Claims, 2 Drawing Sheets

(56) References Cited

U.S. PATENT DOCUMENTS

| | | | | |
|---|---|---|---|---|
| 5,310,024 | A | * | 5/1994 | Takagi ............... 188/72.3 |
| 5,934,417 | A | * | 8/1999 | Kobayashi et al. ......... 188/72.3 |
| 6,378,666 | B1 | * | 4/2002 | Yoko ............... 188/73.38 |
| 6,478,122 | B1 | | 11/2002 | Demoise, Jr. et al. |
| 6,527,090 | B1 | | 3/2003 | Barillot et al. |
| 6,725,980 | B2 | * | 4/2004 | Larkin ............... 188/72.3 |
| 6,920,965 | B2 | * | 7/2005 | Burgdorf et al. .......... 188/73.38 |
| 7,219,773 | B2 | * | 5/2007 | Ono ............... 188/73.38 |
| 7,455,153 | B2 | * | 11/2008 | Ooshima et al. .......... 188/73.38 |
| 7,467,693 | B2 | * | 12/2008 | Barbosa et al. ............ 188/72.3 |
| 8,397,880 | B2 | * | 3/2013 | Chelaidite ............... 188/73.38 |
| 2004/0195057 | A1 | * | 10/2004 | Ooshima et al. .......... 188/73.38 |

FOREIGN PATENT DOCUMENTS

| | | | | |
|---|---|---|---|---|
| JP | 50094581 | A | | 7/1975 |
| JP | 63035845 | A | | 2/1988 |
| JP | 06-043535 | A | | 2/1994 |
| JP | 2004-308789 | | * | 4/2004 ........... F16D 65/097 |
| JP | 3881540 | A | | 2/2007 |

OTHER PUBLICATIONS

Patent Abstracts of Japan, vol. 1997, No. 02, Feb. 28, 1997, JP 08 261261 A, Nissan Motor Co Ltd.

English Abstract of JP4304536, Oct. 27, 1992, Hokkaido Nippon Denki Software KK.

* cited by examiner

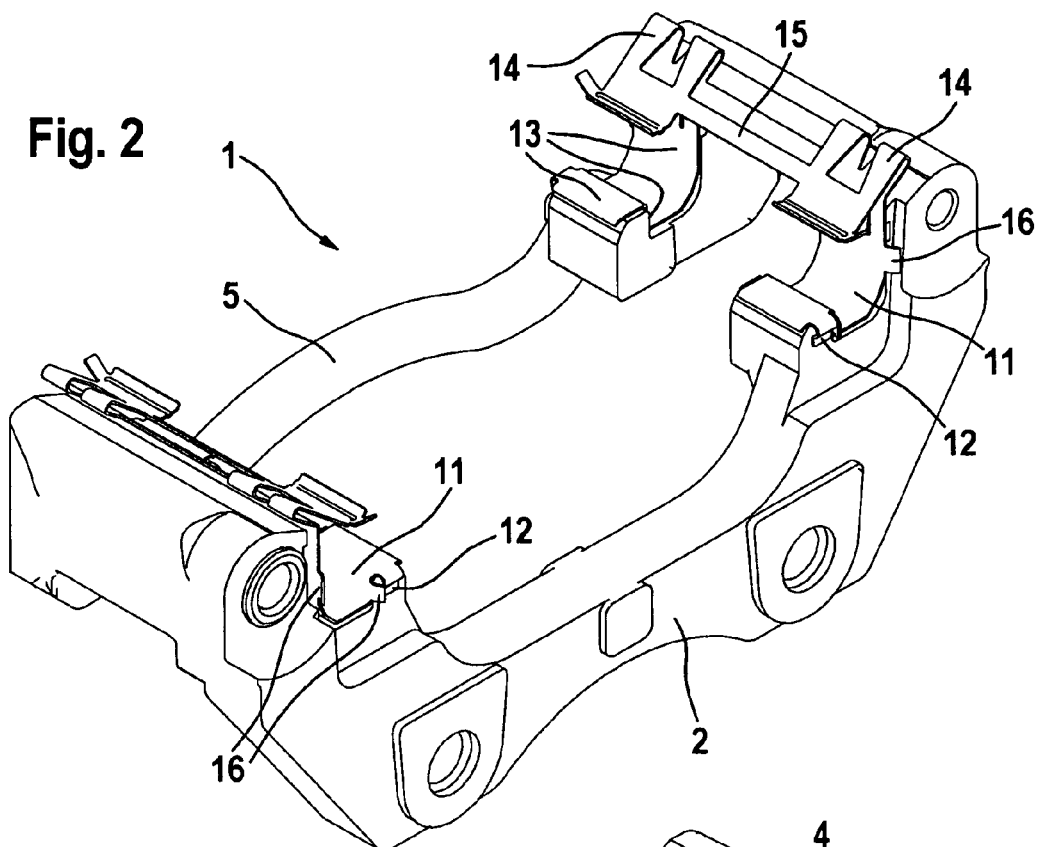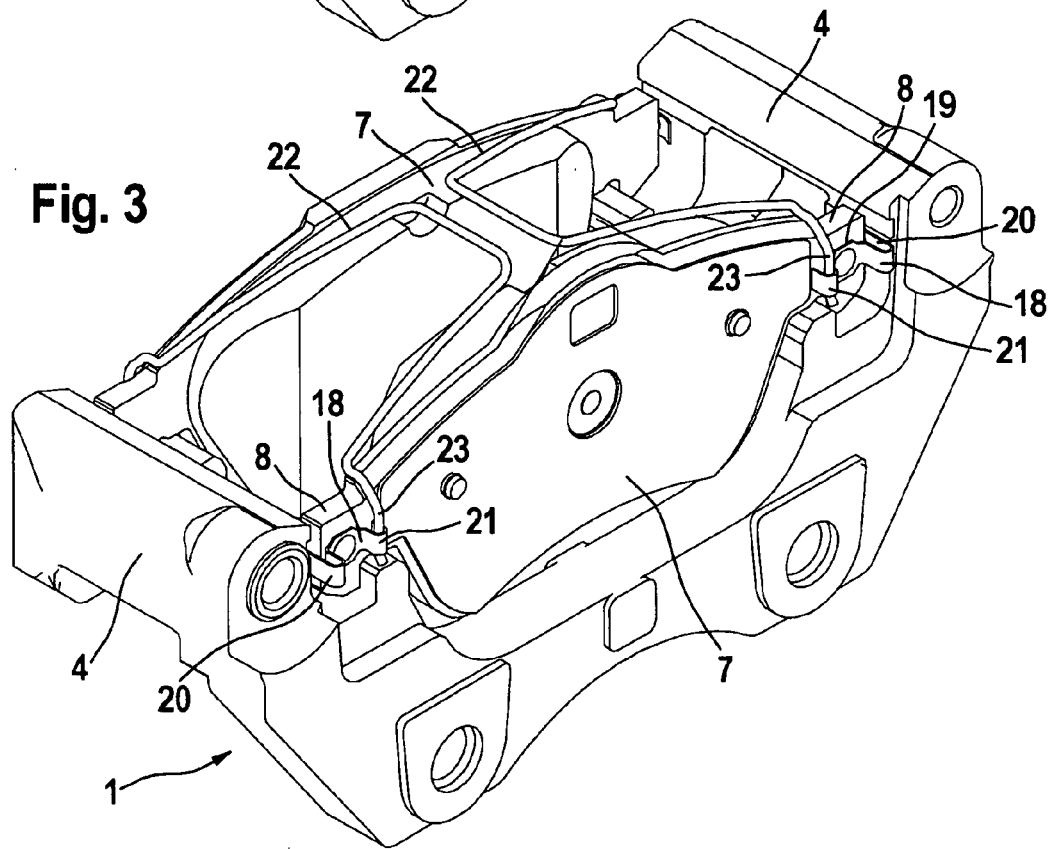

DISC BRAKE WITH A SPRING ATTACHMENT

PRIORITY CLAIM

This application is the U.S. national phase of international application PCT/EP05/52197 filed May 13, 2005, which designated the U.S. and which claims the benefit of priority of German Patent Application Number 10 2004 062 731.2 filed Dec. 12, 2004 and German Patent Application Number 10 2004 027 401.0 filed Jun. 4, 2004. The contents of each of the aforementioned documents are incorporated herein in their entirety.

BACKGROUND OF THE INVENTION

The present invention relates to a disc brake including brake pads, which are slidably received on either side of a brake disc within guide portions of the disc brake, as well as a spring arrangement for spring cushioning the brake pads. Disc brakes of this type are frequently utilized in motor vehicles.

Thus, DE 102 33 446 A1 discloses a brake support member of a floating-caliper disc brake including a brake pad guide spring, and the brake pad guide spring is locked at the brake support member. The brake pad guide spring extends between the brake support member and the respective brake pad, thereby ensuring ease of slidability of the brake pads. In addition, the brake pad guide spring comprises spring arms in order to clamp the brake pads in relation to the brake support member in a rattle-free fashion. The spring arms are configured in such a way that they allow radial mounting of the brake pads and subsequently lock the brake pads radially on the brake support member. However, the easy-to-mount spring arm configuration permits only limited freedom when adjusting the desired spring forces applied to the brake pads.

U.S. Pat. No. 5,249,647 further describes a spring arrangement for a disc brake, which comprises a brake pad guide spring and a clearance spring. The brake pad guide spring safeguards ease of displaceability of the brake pads with respect to the brake support member. Besides, the brake pads are locked radially with respect to the brake support member using the brake pad guide spring. On the other hand, the clearance spring serves for axially resetting the brake pads after brake application. Hence, the brake pads are withdrawn from an associated brake disc when there is no brake application in order to adjust a defined clearance between brake pad and brake disc. The spring arrangement described is, however, unfavorable in terms of assembly, above all of the brake pads.

Based on the above, an object of the invention is to disclose a spring arrangement for the spring cushioning of brake pads in a disc brake, which allows an individual overall spring cushioning of the brake pads in relation to the disc brake depending on the case of application, while having a simple design.

SUMMARY OF THE INVENTION

This object is achieved by a disc brake including a spring arrangement according to the present invention. Disc brakes of this type are frequently used in motor vehicle brake systems. More specifically, the disc brake comprises brake pads, which are slidably arranged on either side of a brake disc within guide portions of the disc brake and are supported for transmitting circumferential brake forces, as well as a spring arrangement for spring cushioning of the brake pads. This spring cushioning of the brake pads principally comprises several spring force components in different spatial dimensions. Therefore, the spring arrangement includes at least one radial spring element for radially clamping the brake pads in relation to the guide portions. Further, the spring arrangement comprises at least one axial spring element for axially clamping the brake pads with respect to one another. Likewise, it is possible to add a tangential spring element optionally to the spring arrangement, ensuring the tangential clamping of the brake pads in relation to the guide portions of the disc brake. The individual spring elements thus act in different spatial dimensions, and the above indications of direction relate to the axis of the associated brake disc. Above all, there is the possibility of designing the individual spring elements as separate components cooperating within a joint spring arrangement. Each spring element, consequently, can be rated and designed in a targeted way to comply with its function.

A favorable design of the disc brake with spring arrangement is achieved in that the radial spring element is attached stationarily to at least one guide portion. In this respect, the guide portions are shaped either at a brake caliper or at a brake support member. The attachment of the radial spring element may e.g. take place by way of a catch or with the aid of a suitable fastening means. The brake pads are finally clamped radially with respect to the brake caliper or the brake support member, respectively, by way of the radial spring element that is fixed in the above fashion. According to a preferred variation, the radial spring element extends, at least in sections, between the brake pad and the guide portion in order to prevent a direct contact between the brake pad and the guide portion. Thus, a corresponding design of the radial spring element will safeguard ease of slidability of the brake pads in the guide portions.

Another appropriate design of the spring arrangement is achieved in that the axial spring element is supported on brake pads on both sides of the brake disc and is displaceable along with the brake pads in relation to the guide portions. In particular, two axial spring elements are provided, which are respectively supported on two brake pads and, thus, ensure that the desired clearance is adjusted upon termination of brake application. Consequently, the axial spring elements displace together with the brake pads within the guide portions. The result is a favorably floating arrangement for the brake pads together with the axial spring elements. For the detachable mounting of the axial spring elements on the brake pads, special accommodations are provided, into which the axial spring elements are hooked in each case. An accommodation of this type is either shaped directly at the brake pad or is provided on a separate component which, in turn, is attached to the brake pad. Such a separate component is preferably a sheet-metal element having an eye-shaped accommodation. The eye-shaped accommodation can also be integrated in a damping plate, which is attached to a back plate of the brake pad.

For the purpose of effective tangential spring cushioning of the brake pads, at least one tangential spring element is attached to the brake pad and extends with a spring portion between the brake pad and the guide portion. The spring portion ensures a tangentially rattle-free clamping of the brake pads in relation to the guide portions in order to prevent e.g. undesirable brake noise when the direction of travel changes (clacking of the brake pads). In addition, a tangential clearance between the brake pads and the guide portions is purposefully allowed due to the tangential spring elements. The tangential clearance allows an insignificant tangential movement of the brake pads during brake operation, what has favorable effects on the corrosion resistance of the brake pad guide. In this arrangement, the tangential spring element attached to the brake pad more particularly forms an accommodation, into which the axial spring element is hooked. To this end, a portion of the tangential spring element is configured in the shape of an eye, for example. This obviates the need to arrange a separate attachment point for the axial spring element at the brake pad. The detachable fastening of the axial spring element is hence advantageous in terms of manufacturing technology. As a whole, both the axial and the tangential spring element along with the brake pads are floatingly displaceable in relation to the guide portions. According to a further development of a variant, exactly one tangential spring element is secured at each brake pad. Thus, each brake pad can be preloaded in a defined tangential direction in a targeted way, for example, in opposition to the main direction of rotation of the brake disc, i.e. during forward travel of the motor vehicle, for example. In this case, each brake pad moves within its tangential clearance when braking during forward travel occurs, which impairs the development of corrosion products in the guide portion.

A particularly advantageous design of the disc brake with a spring arrangement is achieved in that the disc brake includes a stationary brake support member with guide portions, at which support member the radial spring element is detachably caught. A floating caliper is slidably mounted on the brake support member in such a floating-caliper disc brake. The spring arrangement is used to preload the brake pads in three dimensions in relation to the brake support member and towards each other, respectively.

Further suitable detail features of the invention can be seen in the embodiments in the Figures, which are explained more closely in the following.

BRIEF DESCRIPTION OF THE DRAWINGS

In the drawings:
FIG. 2 is a spatial view of the brake support member of FIG. 1 with a radial spring element;
and
FIG. 3 is a spatial view of the brake support member of FIG. 1 including brake pads as well as axial and tangential spring elements.

DETAILED DESCRIPTION OF THE DRAWINGS

Figure 1:
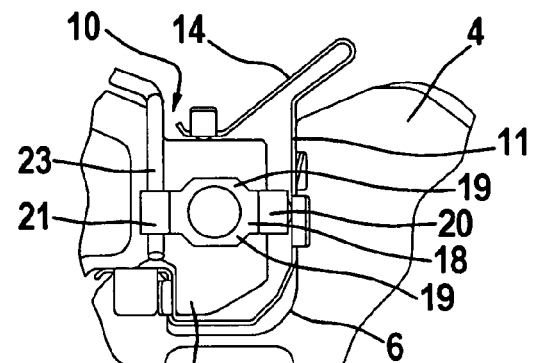
FIG. 1 shows several views of a brake support member of a disc brake with a spring arrangement for the brake pads.
Figure 1:
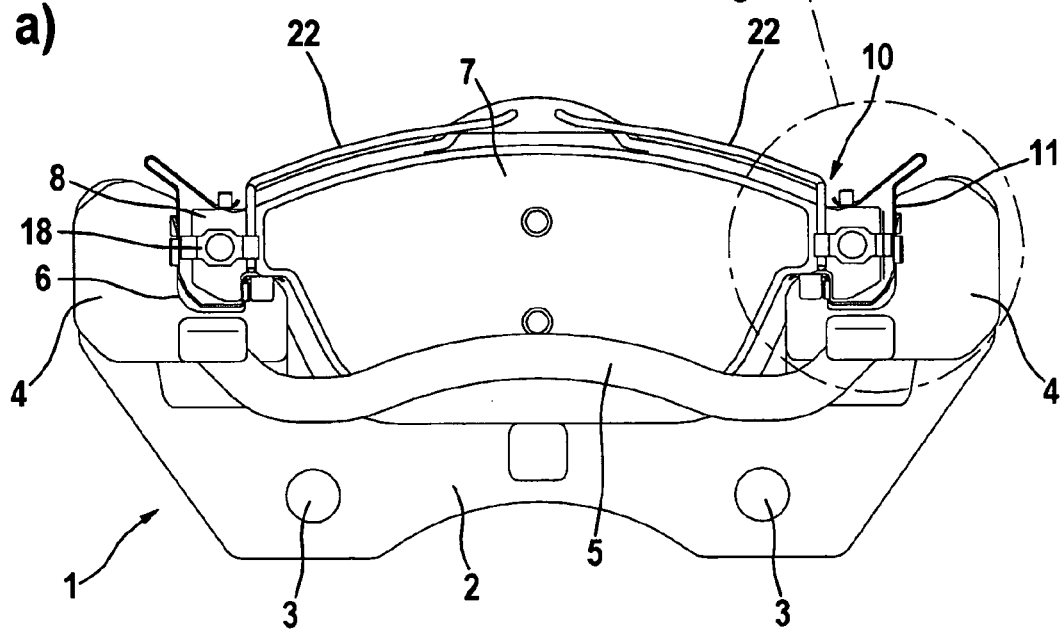
Figure 1:
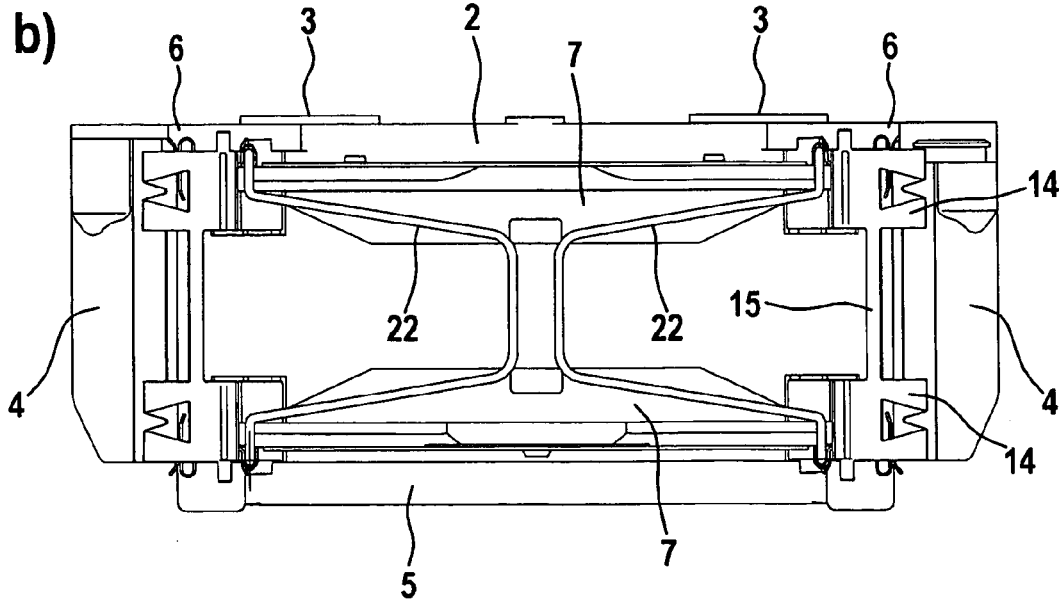

The brake support member 1 illustrated in the Figures is a component of a floating-caliper disc brake, as it is frequently used in motor vehicle brake systems. The brake support member 1 cooperates with an associated floating caliper (not shown), which is axially displaceable mounted on the brake support member 1. The brake support member 1 comprises a base portion 2 with mounting holes 3, by way of which it can be mounted in a stationary manner or formed fast with the vehicle. Adjacent to the base portion 2 are axially extending support member arms 4, which project axially beyond an associated brake disc. To increase the rigidity of the brake support member, the ends of the support member arms 4, being opposite to the base portion 2, are connected to a web 5. At the support member arms 4, guide portions 6 are provided in order to accommodate brake pads 7, which are in turn slidably arranged at the brake support member 1. Within the guide portions 6, each brake pad 7 with lateral projections 8 is axially slidably guided and tangentially supported in each case in order to be able to transmit the circumferential brake forces onto the brake support member 1 that develop in the brake operation. In this respect, the indications of direction principally refer to the axis of the associated brake disc.

For the comprehensive, rattle-free clamping of the brake pads 7 at the brake support member 1 and for achieving further favorable spring effects, a spring arrangement 10 is provided that performs several spring functions. The spring arrangement comprises several spring elements for this purpose.

Initially, the spring arrangement 10 includes at each support member arm 4 a radial spring element 11, as it can be seen in FIG. 2, in particular. FIG. 2 shows a brake support member 1 in the pre-assembled state. Only the radial spring elements 11 are attached to the support member arms 4 in this pre-assembled state. The brake pads 7 are not yet arranged at the brake support member 1. The radial spring element 11 is secured stationarily at the support member arm 4 or guide portion 6, respectively, by means of several lugs 12. In this arrangement, the radial spring element 10 extends between the guide portion 6 at the support member arm 4 and the lateral projection 8 of the brake pad 7. In this connection, the radial spring element 10 forms guiding and/or supporting surfaces 13 for the brake pads 7, on which the lateral projections 8 of the brake pads 7 are guided and supported in radial and tangential directions. The radial spring element 10 thus prevents a direct contact between brake pad 7 and brake support member 1. Ease of slidability of the brake pads 7 can be influenced positively by a corresponding configuration of the radial spring element 10 or its surface. To simplify the assembly of the brake pads, tongues 16 are shaped in addition, which extend in an inclined manner towards the guiding or supporting surfaces 13 and thus provide an insertion aid for the axial installation of the brake pads. For the radial spring cushioning of the brake pads 7, the radial spring element 10 comprises spring arms 14, which bear under preload against the lateral projection 8 of a brake pad 7 in each case. The result is that the brake pads 7 are simultaneously locked radially with respect to the brake support member 1 and are also clamped in a clearance-free fashion. The spring arms 14 preferably are interconnected by means of a strut 15. This prevents undesirable twisting of the spring arms 14 due to an axial displacement of the brake pads. The radial spring element 10 is favorably shaped of a sheet-metal blank, but it may also consist of any other suitable material.

In addition, the spring arrangement 10 includes at least one tangential spring element 18 in order to clamp the brake pads 7 in a rattle-free fashion in a circumferential direction in relation to the brake support member 1. A tangential spring element 18 is illustrated in FIGS. 1a and 3 in particular. Accordingly, each tangential spring element 18 is substantially designed as a resilient sheet-metal strip, which is connected to the brake pad 7 in a captive manner by way of an attachment portion 19. In the embodiment at issue, the attachment portion 19 is riveted at the lateral brake pad projection 8. Other suitable types of attachment are also feasible as an alternative. Thus, the tangential spring element 18 is rigidly coupled to the brake pad 7 and, during the brake operation, displaces with said within the brake support member 1. Principally, the brake pads 7 are received with a tangential play in the guide portions 6 so that they can move insignificantly in a tangential direction when subjected to circumferential brake load. This tangential movement increases the suppression of corrosion in the brake pad guide. For the tangential spring cushioning, the tangential spring element 18 comprises a spring portion 20, which extends between the brake pad 7 and the guide portion 6 or the guiding and/or supporting surface 13 at the radial spring element 11. According to the embodiment in the Figures, tangential spring elements 18 are fitted at both sides of the brake pads 7 so that the brake pads are positioned 'floatingly' in a central position between the support member arms 4. Alternatively, it is likewise possible to provide for a tangential spring element 18 only on one side at the brake pad 7 and to preload the brake pad 7 purposefully in a tangential direction. For example, it is expedient to preload the brake pads 7 in a tangential direction in the brake support member 1 in opposition to the main direction of rotation of the associated brake disc, i.e. during straight travel. A tangential movement of the brake pads 7, which is favorable for corrosion avoidance, will take place in such a case upon each brake application.

In order to reach a good clearance behavior of the brake pads 7 relative to the brake disc for the disc brake, the spring arrangement 10 comprises at least one axial spring element 22, as can be seen in particular in FIGS. 1 and 3. In the embodiment as shown in the Figures, two symmetrically arranged axial spring elements 22 made of spring wire are provided, which have a substantially U-shaped design and are detachably fastened with their free ends 23 to the brake pad 7 each. For example, the free ends 23 can be hooked directly into the brake pad 7. The axial spring elements 22 are coupled to the axial displacement of the brake pads 7 and, hence, they are displaceable with respect to the brake support member 1. An almost constant axial spring force is thus achieved irrespective of the wear condition of the brake pads 7.

According to a design that is favorable in terms of manufacture and assembly, an eye-shaped accommodation 21 is provided at the tangential spring element 18 in each case, into which the free end 23 of the axial spring element 22 can be hooked. This obviates the need for additional manufacturing effort at the brake pad. Alternatively, it is also possible according to a variation (not shown) to provide the eye-shaped accommodation 21 at any other sheet-metal element which, in turn, is fastened to the brake pad 7. It is especially possible, to attach the eye-shaped accommodation 21 at a damping metal plate attached at the brake pad 7. In detail, the U-shaped axial spring elements 22 exert an axial spring force, which tends to urge the brake pads 7 apart from each other in axial direction in order that the desired clearance can develop between the brake disc and the brake pads 7. The axial spring elements 22 extend almost in a circumferential direction of the brake disc and, accordingly, require only little mounting space. In the described embodiment according to the Figures, the axial spring elements 1 within the disc brake are straddled by the floating caliper (not shown), on which the axial spring elements 22 are also radially supported.

Principally, the three separate spring elements 11, 18, 22 of the spring arrangement 10 with their different spring force components are independent of each other and, thus, allow being rated in a targeted way to comply with the respective partial objective. A combination of the three spring elements 10, 18, 22, however, achieves in terms of function a favorable total spring cushioning for the brake pads 7.

As the individual parts used have a simple design, the spring arrangement 10 comprising several spring elements 11, 18, 22, provides a low-cost solution that is easy-to-mount in addition.

Further, the spring arrangement 10 at issue distinguishes by low weight and the favorable corrosion behavior, in particular between brake pad 7 and brake support member 1 or the guiding and/or supporting surfaces 13. On the whole, the spring arrangement 10 described offers an extremely robust design of the individual spring elements 11, 18, 22 and the other components of the disc brake, showing in a low error rate even under extreme operating conditions (e.g. in off-road driving).

The novel spring assembly 10 has been explained with respect to the embodiment of a floating-caliper disc brake with brake support member 1, however, it is generally applicable also in other types of construction of disc brakes. Thus, spring arrangements 10 of this type can be employed in all disc brakes wherein brake pads 7 are displaceably mounted within guide portions 6 in the disc brake.

The invention claimed is:

1. A disc brake including brake pads (7), which are slidably received on either side of a brake disc within guide portions (6) of the disc brake and are supported for transmitting circumferential brake forces, and including a spring arrangement (10) for applying a spring force to the brake pads (7) comprising:
    at least one radial spring element (11) for radially clamping the brake pads (7) with respect to the guide portions (6) and that includes axially extending lugs (12) which stationarily fix the at least one radial spring element on at least one of the guide portions (6), the radial spring element including spring arms (14) that bear a preload against a top surface of projections of each of the brake pads (7);
    at least one axial spring element (22) for axially clamping the brake pads (7) in relation to each other;
    at least one tangential spring element (18) for tangentially clamping the brake pads (7) with respect to the guide portions (6), wherein the tangential spring element (18) is attached to the brake pads (7) and biased against guide portions (6) and forms an accommodation (21), into which the axial spring element (22) is hooked;
    wherein the radial spring element (11) extends between the brake pad (7) and the guide portion (6) in order to entirely prevent a direct contact between the brake pad (7) and the guide portion (6); and
    wherein tongues (16) are integrally formed on the radial spring element (11) and run obliquely with respect to guide and support surfaces (13) and form an insertion aid during axial mounting of the brake pads, the tongues (16) disposed on a radially opposite side of the support surface (13) from the axial extending logs (12) for holding the radial spring element in place on the corresponding one of the guide portions (6).

2. The disc brake as claimed in claim 1, wherein the axial spring element (22) is supported on brake pads (7) on both sides of the brake disc and is displaceable along with the brake pads in relation to the guide portions (6).

3. The disc brake as claimed in claim 2, wherein the axial spring element (22) is hooked into an accommodation (21) fixed at the brake pad (7).

4. The disc brake as claimed in claim 3, wherein the accommodation (21) is integrated into a sheet-metal element attached to the brake pad (7).

5. The disc brake as claimed in claim 1, wherein the tangential spring element (18) is attached to the brake pad (7) and extends with a spring portion (20) between the brake pad (7) and the guide portion (6).

6. The disc brake as claimed in claim 5, wherein exactly one tangential spring element (18) is secured at each brake pad (7).

7. The disc brake as claimed in claim 1, wherein the disc brake includes a stationary brake support member (1) with guide portions (6), and the radial spring element (11) is detachably caught at said brake support member.

8. A disc brake including brake pads (7), which are slidably received on either side of a brake disc within guide portions (6) of the disc brake and are supported for transmitting circumferential brake forces, and including a spring arrangement (10) for applying a spring force to the brake pads (7) comprising:
 at least one radial spring element (11) for radially clamping the brake pads (7) with respect to the guide portions (6) and that includes axially extending lugs (12) which stationarily fix the at least one radial spring element on at least one of the guide portions (6), the radial spring element (11) including spring arms (14) that are biased against a projection (8) of each of the brake pads (7);
 at least one axial spring element (22) for axially clamping the brake pads (7) in relation to each other;
 at least one tangential spring element (18) for tangentially clamping the brake pads (7) with respect to the guide portions (6) is attached to the brake pad (7) and extends with a spring portion (20) biased against the guide portion (6), wherein the tangential spring element (18) forms an accommodation (21), into which the axial spring element (22) is hooked and wherein exactly one tangential spring element (18) is secured at each brake pad (7);
 wherein the radial spring element (11) extends between the brake pad (7) and the guide portion (6) in order to entirely prevent a direct contact between the brake pad (7) and the guide portion (6),
 wherein tongues (16) are integrally formed on the radial spring element (11) and run obliquely with respect to the guide and support surfaces (13) and form and insertion aid during axial mounting of the brake pads; and
 wherein the disc brake includes a stationary brake support member (1) with guide portions (6), and the radial spring element (11) is detachably caught at said brake support member, the tongues (16) disposed on a radially opposite side of the support surface (13) from the axially extending lugs (12) for holding the radial spring element in place on the corresponding one of the guide portions (6).

9. The disc brake as claimed in claim 8, wherein the axial spring element (22) is supported on brake pads (7) on both sides of the brake disc and is displaceable along with the brake pads in relation to the guide portions (6).

10. The disc brake as claimed in claim 9, wherein the axial spring element (22) is hooked into an accommodation (21) fixed at the brake pad (7).

11. The disc brake as claimed in claim 10, wherein the accommodation (21) is integrated into a sheet-metal element attached to the brake pad (7).

12. A disc brake including a brake holder (1) and brake pads (7) with lateral projections (8), with the projections (8) being held in a slidingly guided manner and supported radially and tangentially by a guide portion (6) of holder arms (4) of the brake holder (1) in order to transmit braking operation to the holder arts (4) and a spring arrangement (10) for exerting spring force on the brake pad (7) comprising:

a tangential spring element (18) attached to the brake pads (7) and biased against guide portions (6); and
 a radial spring element (11) of the spring arrangement (10) for radially preloading the brake pads (7) in the direction of the guide portion (6);
 wherein the radial spring element (11) has at least a section between a projection (8) of the brake pad (7) and a guide portion (6) of the brake holder (1), and having guide and support surfaces (13) for radial and tangential support of the projections (8) to prevent direct contact between the brake pad (7) and the guide portion (6);
 wherein the radial spring element (11) has a spring arm (14) which bears radially against a top surface of the projection (8) of the brake pads (7);
 wherein tongues (16) are integrally formed on the radial spring element (11), which tongues (16) run obliquely with respect to guide and support surface (13) and form an insertion aid during the axial mounting of the brake pads, the tongues (16) disposed on a radially opposite side of the support surface (13) from the axial extending lugs 912) for holding the radial spring element in place on the corresponding one of the guide portions (6).

13. The disc brake as claimed in claim 12, further comprising an axial spring element (22) supported on brake pads (7) on both sides of the brake disc and is displaceable along with the brake pads in relation to the guide portions (6).

14. The disc brake as claimed in claim 13, wherein the axial spring element (22) is hooked into an accommodation (21) fixed at the brake pad (7).

15. The disc brake as claimed in claim 14, wherein the accommodation (21) is integrated into a sheet-metal element attached to the brake pad (7).

16. The disc brake as claimed in claim 12, further comprising at least one tangential spring element (18) for tangentially clamping the brake pads (7) with respect to the guide portions (6), wherein the tangential spring element (18) forms an accommodation (21), into which the axial spring element (22) is hooked.

17. The disc brake as claimed in claim 16, wherein the tangential spring element (18) is attached to the brake pad (7) and extends with a spring portion (20) between the brake pad (7) and the guide portion (6).

18. The disc brake as claimed in claim 16, wherein exactly one tangential spring element (18) is secured at each brake pad (7).

19. The disc brake as claimed in claim 12, further comprising a stationary brake support member (1) with guide portions (6), and the radial spring element (11) is detachably caught at said brake support member.

20. The disc brake as claimed in claim 1, wherein the axially extending lugs (12) are disposed on an end of the radial spring element (12) farthest apart from the spring arms (14).

21. The disc brake as claimed in claim 20, wherein the tongues (16) and the axially extending lugs (12) are both inclined relative to the support surface (13) radially outward to contact a side surface of the guide portions (6) of the disc brake.

* * * * *